United States Patent [19]

Beaulieu

[11] 4,143,642

[45] Mar. 13, 1979

[54] HIGH TEMPERATURE THERMAL STORAGE SYSTEM UTILIZING SOLAR ENERGY UNITS

[75] Inventor: Adrian A. Beaulieu, West Bridgewater, Mass.

[73] Assignee: Vapor Corporation, Chicago, Ill.

[21] Appl. No.: 726,060

[22] Filed: Sep. 24, 1976

[51] Int. Cl.² .............................................. F24J 3/02
[52] U.S. Cl. ..................................... 126/271; 62/238; 62/324; 237/1 A; 237/2 B
[58] Field of Search ...................... 126/270, 271, 400; 237/1 A, 2 B; 62/2, 283, 324 D, 283 E; 165/29, 18; 60/641, 413, 659

[56] References Cited

U.S. PATENT DOCUMENTS

| | | | |
|---|---|---|---|
| 1,969,187 | 8/1934 | Schutt | 237/1 A |
| 2,751,761 | 6/1956 | Borgerd | 62/324 D X |
| 2,942,411 | 6/1960 | Hutchings | 60/659 X |
| 2,969,637 | 1/1961 | Rowekamp | 60/659 X |
| 3,301,002 | 1/1967 | McGrath | 62/238 E X |
| 3,422,248 | 1/1969 | Beaulieu et al. | 237/19 X |
| 3,630,275 | 12/1971 | Beaulieu et al. | 165/154 |
| 3,952,519 | 4/1976 | Watson | 126/400 |
| 3,977,197 | 8/1976 | Brantley, Jr. | 60/659 |
| 3,991,938 | 11/1976 | Ramey | 237/2 B |
| 3,996,759 | 12/1976 | Meckler | 62/238 |
| 4,007,776 | 2/1977 | Alkasab | 62/2 |
| 4,030,312 | 6/1977 | Wallin et al. | 62/238 |
| 4,034,738 | 7/1977 | Barber, Jr. | 237/1 A |
| 4,050,455 | 9/1977 | Huse | 126/271 |

Primary Examiner—Carroll B. Dority, Jr.
Assistant Examiner—Larry Jones
Attorney, Agent, or Firm—Francis J. Lidd

[57] ABSTRACT

A thermal storage system includes a solar collector. A first fluid circulating through the collector is piped to a heat exchanger wherein heat in the first fluid is transferred to a second fluid circulating through a heat pump circuit. The temperature of the second fluid is further elevated by the heat pump and is circulated through a second heat exchanger thereby transferring heat to a third fluid. The third fluid is circulated through a third heat exchanger to elevate the temperature of a fourth fluid stored in a high pressure, high temperature storage tank. The fourth fluid is employed to elevate the temperature of a working fluid that may be used for consumption or heating. Alternate embodiments of the fluid system include an accumulator tank wherein heat from the first fluid is transferred to fluid in the accumulator tank. Heat from the fluid in the accumulator tank is transferred to the second circulating fluid or heat utilization means as required. Automatic transfer to a fourth fluid heated by auxiliary means, and stored at high pressure and temperature is provided when the accumulator tank temperature drops below a pre-set valve.

20 Claims, 5 Drawing Figures

HIGH TEMPERATURE THERMAL STORAGE SYSTEM UTILIZING SOLAR ENERGY UNITS

BACKGROUND OF THE INVENTION

A. Field of the Invention

The present invention relates to new and improved systems for utilizing solar energy to heat domestic water systems and to heat and cool residential and commercial buildings.

B. Description of the Prior Art

Solar energy is one of the few safe, inexhaustible, and pollution free energy resources presently available. As technology and present fuel prices increase, the utilization of solar energy will become even more economically feasible. In view of this and the fact that the utilization of solar energy is particularly applicable to the heating and cooling of commercial and residential buildings and to the heating of domestic water, heat from solar radiation has been used in various forms for many years.

However, use of the sun's energy suffers from several disadvantages. For example, in solar heating 100% standby heat is required. This is necessary to compensate for prolonged periods when solar energy is not available. These periods include cloudy and/or rainy days and winter evenings.

In addition, the time varying nature of a solar system requires substantial standby heat storage. Storage is necessary to accumulate quantities of heat during the times when solar energy is available, i.e., during the day when requirements are low, in order to provide sufficient supply during peak heat demand periods, usually occurring after sundown. This can greatly increase the cost of installing and utilizing a solar energy system, since in addition to equipment for 100% standby storage, fluid must be stored at prolonged periods of time and must be maintained at a high temperature throughout these periods.

In a system utilizing fluids as heat storage media, to achieve sufficient heat content for heating over prolonged periods of time with equipment of reasonable cost and size stored fluid must be elevated to a substantial temperature. However, elevating the temperature above the fluid's atmospheric boiling point requires operation at high pressure and results in production of steam substantially reducing the utility of the stored fluid. Therefore, prior art solar heat systems have utilized sub-boiling operation. A solar system employed for heating that only utilizes low pressure, and, thus, low temperature fluid is disclosed on pages 8–14 in a paper presented to the American Society of Civil Engineers Annual and National Engineering Convention in Kansas City, Missouri on Oct. 25, 1974. This paper was written by Craig Lentz of Arthur D. Little, Inc., Cambridge, Massachusetts. However, as indicated above, systems of this type require extremely large storage tanks to provide adequate capacity.

SUMMARY OF THE INVENTION

It is therefore an object of this invention to provide a heating and cooling system which utilizes solar heat inputs and has adequate storage with standby heating utilizing storage tanks of reduced size.

A further object of this invention is to provide a heating and cooling system with a source of thermal energy utilizing solar and electrical energy sources, with thermal storage of the sources, and which is interruptable to reduce peak power demand on the electrical energy source while maintaining energy inputs to heating and cooling loads.

An additional object of this invention is to provide a thermal energy source which utilizes solar and fossil fuel derived energy to provide adequate energy storage to allow a reduction or cessation of either inputs, allowing consumption of the energy inputs to be limited to off-peak demand periods.

An additional object of this invention is to provide a heat source system utilizing solar and supplementary heat inputs, which provides peak load deferral for both inputs and outputs.

A further object of the present invention is to provide a new and improved system for employing solar energy to provide heating and the like.

Another object of the present invention is to provide a new and improved solar energy system that may be economically employed to heat domestic water supplies in resident and commercial buildings.

A further object of the present invention is to provide a new and improved solar energy system that will store high temperature fluid at high pressures over prolonged periods of time.

Briefly, the present invention is directed to a new and improved heating system employing a solar collector. The solar collector is employed to elevate the temperature of a first circulating fluid such as glycol and, in a preferred embodiment, transfer the elevated temperature to a second fluid circulating through a heat pump circuit. The temperature of the second fluid after being elevated by the high temperature glycol is further elevated by the heat pump. The elevated temperature of the second fluid is transferred to a third fluid circulating through a high pressure, high temperature fluid storage unit. The fluid storage unit includes a reservoir of a fourth fluid whose temperature is maintained at a high level by transfer from the third fluid or, if necessary, supplemental heating means.

If the temperature of the glycol circulating through the solar collector is not elevated to a predetermined level, this circuit is terminated. Moreover, once the temperature of the fluid stored in the high temperature, high pressure storage unit drops below a predetermined level, the supplemental source, such as an electrical heating element, is employed to maintain the fluid at the desired temperature level. The fourth fluid is utilized to elevate the temperature of various working system fluids, such as water, that are circulated in heat transfer relationship through the fourth fluid. The water or working system fluid may then be used for consumption i.e., domestic hot water, or for heating or cooling i.e., "hot water supply". Moreover, the hot water supply may be circulated through a heat utilization device such as a heating coil mounted within the ducts of a warm air furnace or fan coil unit thereby elevating the temperature of the warm air and supplementing the work of the furnace. Alternatively, the water with the elevated temperature may be circulated through a "run around loop" i.e., an additional closed loop heat pump cycle and evaporator to distribute heat throughout a building.

A further embodiment of the present invention employs an accumulator tank containing fluid in heat transfer relationship with the circulating glycol. Accordingly, when the glycol is heated above a predetermined level by the solar collector, heat stored in the glycol is transferred to a reservoir of fluid accumulated in the tank. If the temperature of the glycol drops below a desired level, the circulation of the glycol is terminated. If the fluid in the accumulator tank is above a preselected level, it may be employed to heat or preheat water or a similar fluid used for domestic use or heating a building or the like. The fluid accumulated in the accumulator tank can also be employed to elevate the temperature of the previously described second circulating fluid that is in heat transfer relationship with the third fluid circulating through the closed loop heat pump thereby elevating the temperature of the fluid in the heat pump circuit as in the previous embodiment.

In this way it is possible to utilize the readily available quantities of solar heat at relatively low temperatures and, when necessary, "upgrade" the solar inputs through the use of a heat pump to more useable temperatures. The higher temperatures providing a means for reducing tank storage size or increased storage energy. Those skilled in the art of heat pumps will recognize that at readily attainable coefficients of performance, economics over direct electric heating of at least 50% can be achieved.

In an alternate embodiment, solar heat is collected in a sub-saturation storage tank, and utilized directly when above a pre-selected temperature. When heat losses exceed the storage capacity reducing the tank temperature below the preselected value, an auxiliary system, utilizing liquid stored at temperatures above saturation temperature is automatically utilized to supply the required heat. This arrangement greatly reduces the size and cost of an equivalent sub-saturation system, and in addition further reduces the peak energy demand since both standby and solar systems employ storage.

An additional and possibly more important advantage provided is the capability of "peak deferral" of both energy input and withdrawal. The system of this invention can absorb maximum input from both solar and/or standby heat and deliver deliver maximum output although the "peaks" of these inputs and outputs are many hours apart. Substantial energy cost savings and increased utility equipment utilization can be achieved through the use of the sophisticated energy storage system.

BRIEF DESCRIPTION OF THE DRAWINGS

The present invention together with the above and other objects and advantages will best appear from the following detailed description of the illustrative embodiments of the invention shown in the accompanying drawings, wherein.

DESCRIPTION OF THE PREFERRED EMBODIMENTS

Figure 1:
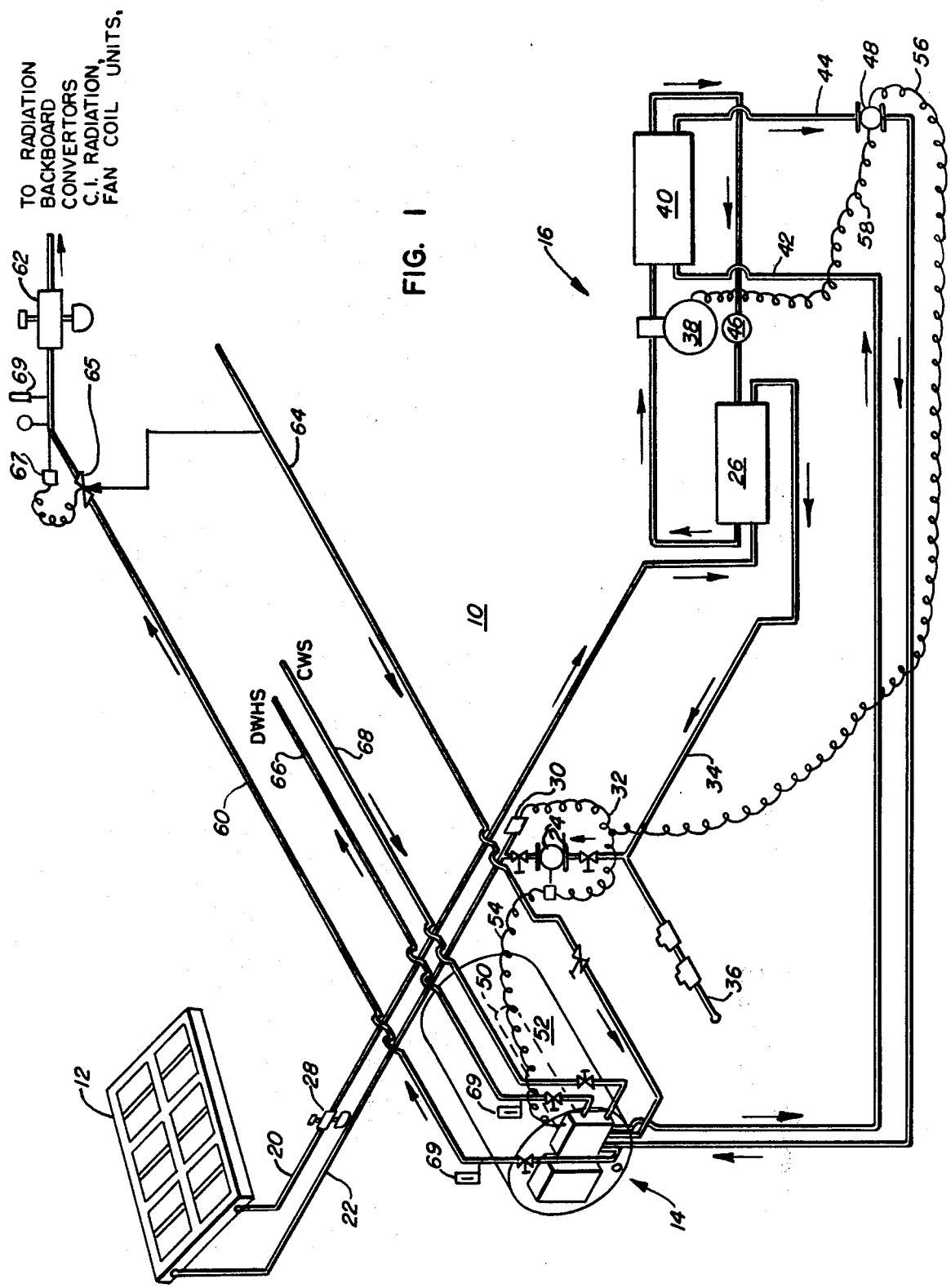
FIG. 1 is a diagrammatic illustration of a demand type system constructed in accordance with the principles of the present invention.

With reference initially to FIG. 1, there is illustrated a high temperature thermal storage system 10 utilizing a solar energy input. System 10 is of the demand type and employs a solar collector generally designated as 12 to elevate and supplement the temperature of a fluid circulating through a hydronic-electric heating system 14. The system 14 is employed to heat a fluid such as water for heating, cooling or domestic use. A detailed description of the hydronic-electric heating system 14 is presented in the U.S. Pat. Nos. 3,422,248 — Beaulieu et al. and 3,630,275 — Beaulieu et al.

The demand type system 10 illustrated in FIG. 1 allows the storage of a fluid such as water at a high pressure and at a temperature above the atmospheric boiling point of the water. To assist in elevating the temperature of the fluid, the system 10 includes the solar collector 12 that is structurally limited to elevating the temperature of fluid to the range of 100°-200° F. at a low pressure. This low temperature fluid is further elevated in temperature by a heat pump circuit generally designated as 16. The heat pump circuit 16 substantially increases the entropy of the circulating fluid within the system 10 and at the same time elevates the pressure of the fluid thus allowing increased temperatures in the range of 200°-350° F. The temperature of this high temperature and high pressure fluid is in turn transferred to high pressure fluid stored in the system 14.

Accordingly, system 10 stores fluid at a high pressure and temperature in the hydronic system 14 to be used to heat water for heating or for domestic use while employing economical means for producing the desired temperature levels.

This system 10 is designated as a demand type system since as increased fluid temperatures are required, the solar collector 12 is employed to elevate or supplement the entropy of a circulating fluid. Once the temperature within the hydronic-electric heating system 14 is at the desired temperature, the solar heat inputs are terminated and circulation of fluid through the collector 12 is also terminated.

More specifically, the system 10 employs a solar collector 12 of the type well known in the art. The solar collector 12 employs a plurality of individual collectors, usually of the flat plate type, although any other means of intercepting incident solar energy, converting it to sensible heat and transferring the heat to a fluid can be used. Circulating through the solar collector 12 is a first fluid that may be water or a variety of antifreeze solutions such as glycol. Although water is an excellent heat retaining medium, the employment of glycol is often necessary to prevent freezing in the collector cells or supply and return lines 20 and 22 since these lines often pass through an outside environment from the solar collector 12 to the heat pump 16.

The first circulating fluid is circulated through the supply line 20 by pump 24 to the evaporator, heat exchanger 26 in the heat pump circuit 16. Included in the supply line 20 is a vent 28 that may be employed to vent the fluid lines 20 and 22 if the pump 24 is turned off thereby terminating the flow of fluid through the lines 20 and 22. If the collector 12 is self-draining, antifreeze solutions such as glycol may be eliminated since fluid will not remain in the lines 20 and 22 allowing it to freeze.

Typically, the collector 12 is operated when the solar energy collected is sufficient to elevate the temperature of the first circulating fluid to a level of 100°–200° F. This temperature level of the first circulating fluid is monitored by an aquastat 30 in line 22. The aquastat 30 is electrically connected to pump 24 by control lead 32. If the temperature of the first circulating fluid flowing through supply line 20 drops below the desired temperature level, the aquastat 30 shuts off the pump 24 thus terminating the circulation of the first fluid through the supply 20 and return 22 lines. This is necessary since if the temperature of the first circulating fluid is below the desired level, the first circulating fluid will not be effective in elevating the temperature of the fluid in the system 10 to the desired minimum level.

If the temperature of the fluid flowing through supply line 20 is sufficient, it is passed through the evaporator, heat exchanger 26 and the temperature of the first circulating fluid is transferred to a second fluid circulating through the heat pump circuit 16. The first circulating fluid after passing through the heat exchanger 26 is returned to the solar collector 12 through return line 34 that passes through pump 24 to line 22. A fluid source 36 interconnects with the line 34 and is connected to a local water supply to pressurize the first circulating fluid.

The heat pump circuit 16 is employed to elevate the temperature of the second fluid circulating through the heat pump circuit 16 to a range of 200°–350° F., and to raise the pressure of the fluid. The second circulating fluid is typically a refrigerant whose pressure and temperature is substantially increased by passing through a compressor 38. The second circulating fluid is then passed through a condensor, heat exchanger 40 where the second circulating fluid looses heat as it condenses from a vapor to a liquid. This procedure transfers heat from the second circulating fluid to a third fluid circulating through a supply line 42 and a return line 44. The second circulating fluid after passing through the condensor heat exchanger 40, passes through the pressure reducing valve 46 further reducing the pressure and vaporizing the second circulating fluid. The second circulating fluid is then evaporated by heat from the collectors by passing through the evaporator heat exchanger 26.

The heat pump circuit 16 has the advantage of reducing input power costs to typically one-half that of direct resistance heating since the co-efficient of performance (COP) of the heat pump 16 is approximately two. Accordingly, combining the heat pump circuit 16 with the solar collector 12 substantially reduces the cost of elevating the temperature of the fluid in system 10. As those skilled in the heat pump art will appreciate COP's in the range of 2–3.5 are attainable.

The third circulating fluid is circulated in heat transfer relationship through the hydronic-electric system 14 under the influence of the pump 48. The hydronic system 14 includes a heat exchanger generally designated as 50 mounted within a tank 52. The tank 52 contains a fluid such as water at a high pressure and at a temperature of approximately 280° F. This fluid is in heat transfer relationship with a fourth circulating fluid that may be used for heating, cooling or domestic use.

Both the fluid stored in tank 52 and the second circulating fluid are at an increased pressure; accordingly, the temperature of these fluids may be elevated substantially above their atmospheric boiling points thereby greatly increasing their ability to maintain a sufficient quantity of heat and therefore a temperature above that level necessary to heat a building for prolonged periods of time.

The fourth circulating fluid may be circulated through line 60 to a heat utilization device such as a radiator or a similar device. Mounted within the line 60 is a combination air vent, air separator and compressor 62 that is employed to eliminate entrained air within the fourth circulating fluid supplied to the heat utilization device. This entrained air may result from radiators, leaks or the like. The fourth circulating fluid after passing in heat transfer relationship with the heat utilization device returns via line 64. A mixing valve 65 is located in the line 60 to maintain the supply temperature at a preset valve bypassing the compressor 62 when demand for heat is low. The operation of the mixing valve 65 is controlled by the aquastat 67 mounted in line 60.

Moreover, the fluid of elevated temperature and pressure within the tank 52 may be employed to elevate fluid such as water for domestic use. The water is circulated to the domestic demand through line 66 and returned through line 68.

The system 10 employs the solar collector 12 as the first step in elevating the temperature of the fluid stored in the tank 52. However, if the solar collector 12 is not elevating the temperature of the first circulating fluid to the desired level because, for example, it is a cloudy day; the system 10 must be shut off. To accomplish this the aquastat 30, in addition to being electrically connected to pump 24, is also electrically connected to the heat exchanger 50 by a lead 14 to the pump 48 and to the compressor 38 by leads 56 & 58. In this manner, if the temperature of the first circulating fluid through the solar collector 12 drops below the preferred lower level, the aquastat 30 will operate to turn off pump 24, and the pump 48 as well as compressor 38, thus terminating the fluid circulating through the circuit 10. If this condition continues for a prolonged period of time such that the fluid within the tank 52 drops below the preferred temperature level of 280° F., an external electrical heating source (not shown) is employed to maintain the temperature of the fluid within the tank 52 at a preferred minimum level, thereby supplying heat to the demand units as the demand occurs.

Conversely, as the fluid in the tank 52 is elevated to a temperature greater than the preferred upper limit of approximately 300° F., the circulation of the first and second circulating fluids may be terminated through the provision of the electrical connection between the hydronic-electric heating system 14 and the pump 48 by leads 54 and 56. The compressor 38 is turned off by a signal from the system 14 through the wires 56 and 58.

Also employed in the system 10 are a plurality of thermometers 69 that are primarily employed for operation checks and performance determination of the system during operation and they perform no control function.

As previously mentioned, the system 10 illustrated in FIG. 1 is a demand type system. However, it often occurs that the solar collector 12 may be collecting sufficient energy to elevate the temperature of the first circulating fluid to the desired level; but, at the same time, the temperature of the fluid stored in the tank 52 is of a sufficient level that the operation of the solar collector 12 is not necessary. Accordingly, the aquastat 30 would terminate the circulation of the fluid through the solar collector 12 and the heat pump circuit 16.

Figure 2:
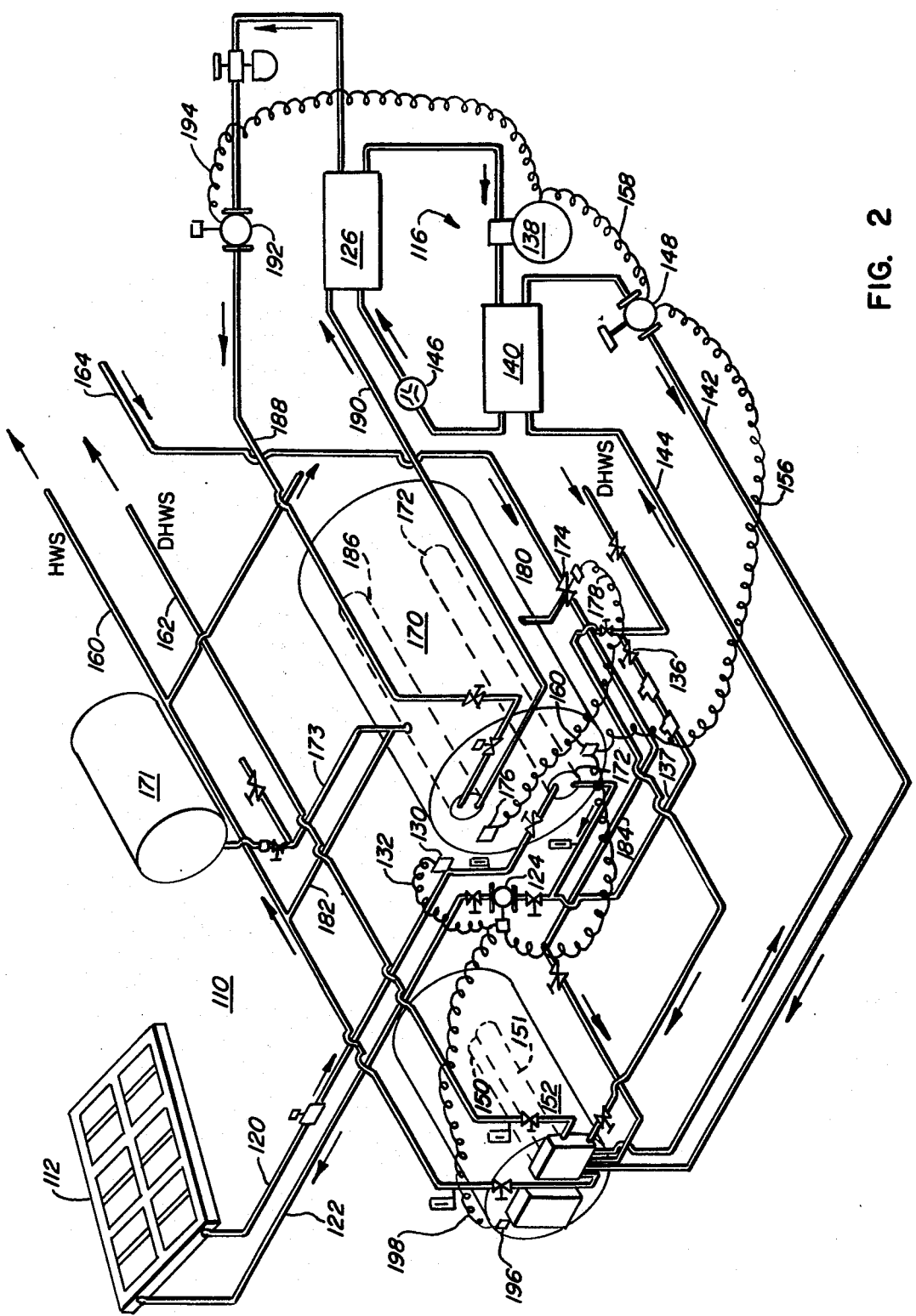
FIG. 2 is a diagrammatic illustration of an alternative embodiment of a system similar to that illustrated in FIG. 1 including a storage capability.

This demand system 10 does not fully employ the energy collected by the solar collector 12. To overcome this disadvantage, a second embodiment of the system is illustrated in FIG. 2. The high temperature thermal storage system generally designated as 110 is substantially similar to the system 10 disclosed in FIG. 1; however, an auxiliary storage tank 170 is employed to store the energy collected by the solar collector 112 during periods when the temperature level of tank 152 is sufficient.

As in the system 10, a first fluid is circulated through a solar collector 112 via supply line 120 and return line 122 by a pump 124. The first circulating fluid passes through a heat exchanger 172 mounted within the tank 170. The heat exchanger 172 transfers the heat in the first circulating fluid to a barrier fluid, such as water, stored in tank 170. The first circulating fluid is then returned to the solar collector 112 through line 122. Tank 170 is connected to an expansion tank 171 via line 173 to allow fluid and vapor expansion from tank 170 as the temperature of the fluid stored in the tank 170 rises.

There is also included an aquastat 130 in the supply line 120 that is connected to the pump 124 by an electrical lead 132. The aquastat 130 controls the operation of the pump 124; and if the temperature of the first circulating fluid through the solar collector 112 drops below a desired range, say 100°-200° F., the aquastat 130 will terminate the operation of the pump 124, and, thus, the circulation of the first fluid through the heat exchanger 172.

To pressurize the first circulating fluid, there is an external fluid supply source 136 that is connected to the first circulating fluid via line 137.

The auxiliary tank 170 stores fluid at a temperature as elevated by the first circulating fluid. If the temperature of the fluid within the reservoir 170 is of a sufficient level to meet the demands of a heat utilization device (not shown) connected to the system 110 by line 160, a fifth circulating fluid circulated through line 160 and returned through line 164 is directed through the tank 170. This occurs through the employment of a diverter valve 174 which is directly connected by an electrical wire 178 to an aquastat 176 mounted within the tank 170. The diverter valve 174 is actuated by the aquastat 176 such that the fluid circulating through the heat utilization device via lines 160 and 164 is diverted from line 164 through line 180 and through the auxiliary tank 170. This fifth circulating fluid, after being elevated in temperature, flows out of the tank 170 through line 182 and to line 160 to be recirculated through the heat utilization means.

However, if the fluid within the auxiliary tank 170 is below the preferred temperature level, typically 160° F., but above a predetermined minimum level; the aquastat 176 actuates the diverter valve 174 to discontinue the diversion of fluid from line 164 through line 180 and, instead, diverts the fluid through the line 184 to the heat exchanger generally designated as 150 mounted within the high temperature, high pressure tank 152.

In this latter condition wherein the fluid stored within tank 170 is below the desired level for heating but of a sufficient temperature to be used in the system 110, a second circulating fluid is passed through a heat exchanger 186 that is in heat transfer relationship with the fluid stored in the auxiliary tank 170. This second circulating fluid passes through a supply line 190 and a return line 188 directing the second circulating fluid through an evaporator-heat exchanger 126. This fluid is circulated through the employment of the pump 192 in line 188.

The second circulating fluid passing through the evaporator-heat exchanger 126 elevates the temperature of a third circulating fluid circulating through the heat pump circuit 116. The heat pump circuit 116 is similar to the heat pump circuit 16 illustrated in FIG. 1 and employs a compressor 138, a condensor 140 and an expansion valve 146.

This third circulating fluid is in heat transfer relationship through the condensor-heat exchanger 140 with a fourth circulating fluid circulating through lines 142 and 144 under the influence of the pump 148 in a manner similar to that illustrated in FIG. 1. This fourth circulating fluid passes through the heat exchanger 151 elevating the temperature of the fluid stored in a tank 152.

If the temperature of the fluid stored in the tank 170 drops below the preferred temperature level due to prolonged discontinued operation of the solar collector, for example, during a cloudy period, the third and fourth circulating fluids must be terminated since the heat from circuit 116 will not be sufficient to elevate the low temperature third circulating fluid to an adequate level to meet the minimum temperature requirements of the system 110. Accordingly, an aquastat 160 is electrically connected to the pump 148, compressor 138 and pump 192 by leads 156, 158, and 194, respectively. Once the aquastat 160 senses the undesired temperature level of the fluid stored in the tank 170, the pumps 148 and 192 and the compressor 138 are turned off thus terminating the circulation of the third and fourth circulating fluids. Under these circumstances, if the temperature of the high pressure fluid stored within the tank 152 drops below the desired level, auxiliary heating sources such as an electrical immersion heater (not shown) may be employed to maintain the temperature of the fluid within the tank 152 at the desired level.

In addition, an aquastat 196 is in temperature sensing relationship with the high pressure, high temperature fluid stored within tank 152 and is electrically connected by a lead 198 to the pump 124. Accordingly, if the temperature of the fluid within tank 152 is of a sufficiently high level, preferably at no greater than 300° F., the aquastat 196 will turn off the pump 124 as well as pumps 148 and 192 and compressor 138 through leads 198, 156, 158, and 194 to terminate the flow of the first, second, third and fourth circulating fluids thus preventing overheating of the fluid stored in tank 152.

The high pressure, high temperature fluid stored within the tank 152 is employed in a manner similar to that in the system 10 to elevate the temperature through heat exchangers (not shown) of the fourth circulating fluid or hot water supply (HWS) that flows through the lines 160 and 162 to a heat utilization device or to a domestic hot water supply (HWS), respectively.

Figure 3:
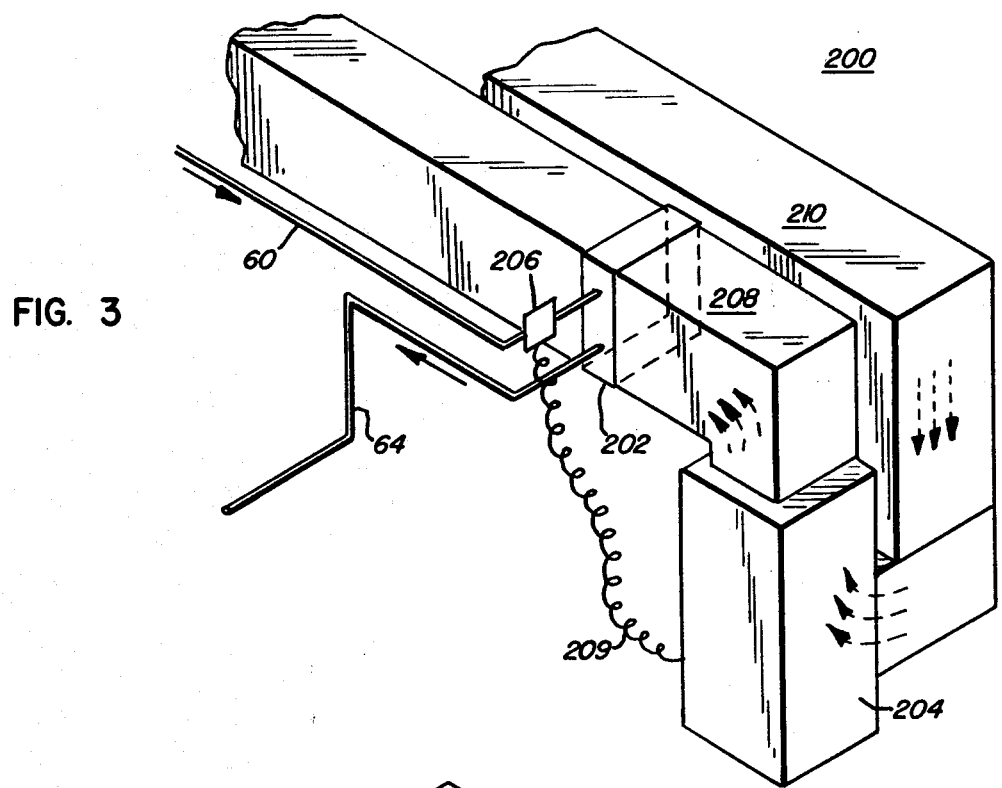
FIG. 3 is a schematic illustration of a heat utilization device than may be employed with a system of the present invention.
Figure 4:
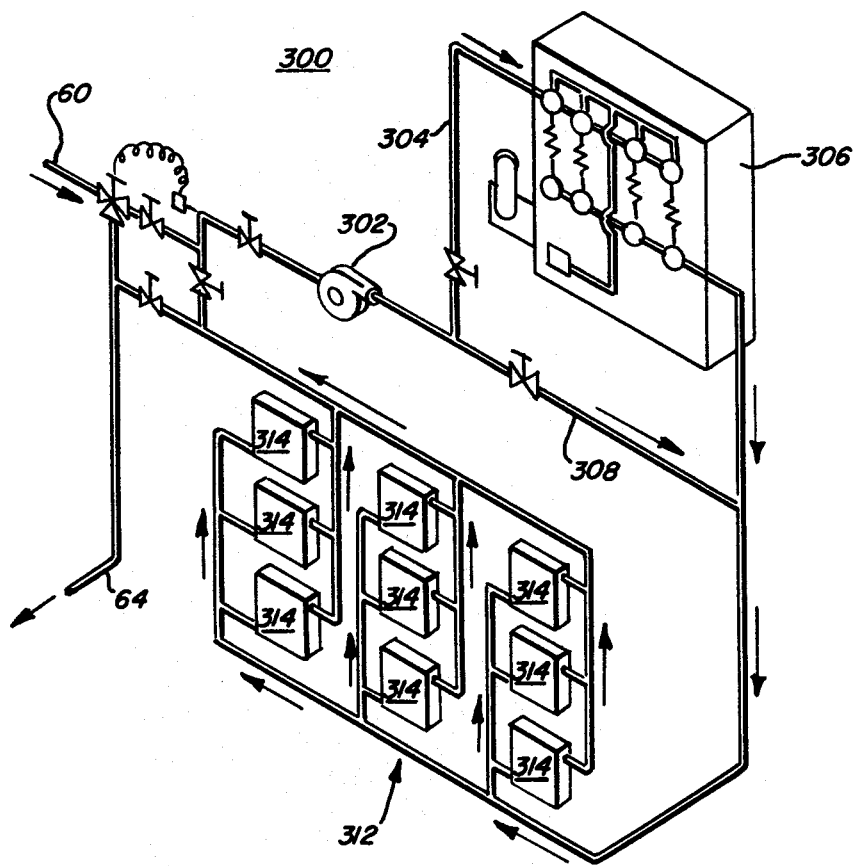
FIG. 4 is a schematic illustration of an alternative heat utilization device that may be employed with a system of the present invention.

Turning now to FIGS. 3 and 4, illustrated in these figures are two alternative heat utilization devices that may be employed with either system 10 or 110. More specifically, with reference to FIG. 3, there is disclosed a warm air heating system generally designated as 200. The warm air heating system 200 employs a heating coil 202 that is in fluid circulating communication with either line 60 or line 160 and return lines 64 and 164 illustrated in FIGS. 1 and 2 (in FIG. 3 lines 60 and 64 are illustrated). Fluid of the desired temperature level is circulated through the heating coil 202 in heat transfer relationship with warm air circulating through ducts 208 and 210 of the warm air furnace 204. Mounted within the fluid supply line 60 is a ductstat 206 that is electrically connected by a wire 209 to a fan motor (not shown) within the warm air furnace 204. When the fluid circulating through line 60 drops below a preferred temperature, the ductstat 206 turns off the fan motor thus terminating the circulating flow of warm air through ducts 208 and 210.

Turning now to FIG. 4, a second heat utilization device 300 is illustrated. This device 300 is connected to fluid line 60 or 160 and return line 64 or 164 (in FIG. 4 lines 60 and 64 are illustrated). The supply fluid from line 60 is circulated by a pump 302 and a portion of the fluid is directed through a line 304 to an evaporative condensor 306, and as will be understood by those skilled in the art this portion is reduced in temperature. A second portion of the fluid is directed through a line 308. The two portions of fluid are combined and further circulated through the heat pump condensing and evaporating loop 312, sometimes known as a "run around loop", where heat is alternatively rejected and absorbed by the individual heat pumps 314. The closed loop heat pump loop or circuit 312 therefore directs energy to the desired location through individual heat pumps 314. It should be noted that the energy requirements of these heat pumps 314 vary widely and the net heat requirements may be positive or negative. After passing through the individual heat pumps 314, the fluid is returned to line 64 and subsequently to the heat exchanger in the fluid storage tank 52 or 152.

Utility companies experience peak demand periods typically during the day for energy followed by substantail reductions in demand during the evening hours. In order to provide energy efficiently, utility companies grant its customers substantial cost savings if their demand is deferred to non-peak periods. Accordingly, a system that consumes purchased energy during non-peak periods while remaining operational during the peak periods is highly desirable. Such a system may be termed a peak deferral system.

Figure 5:
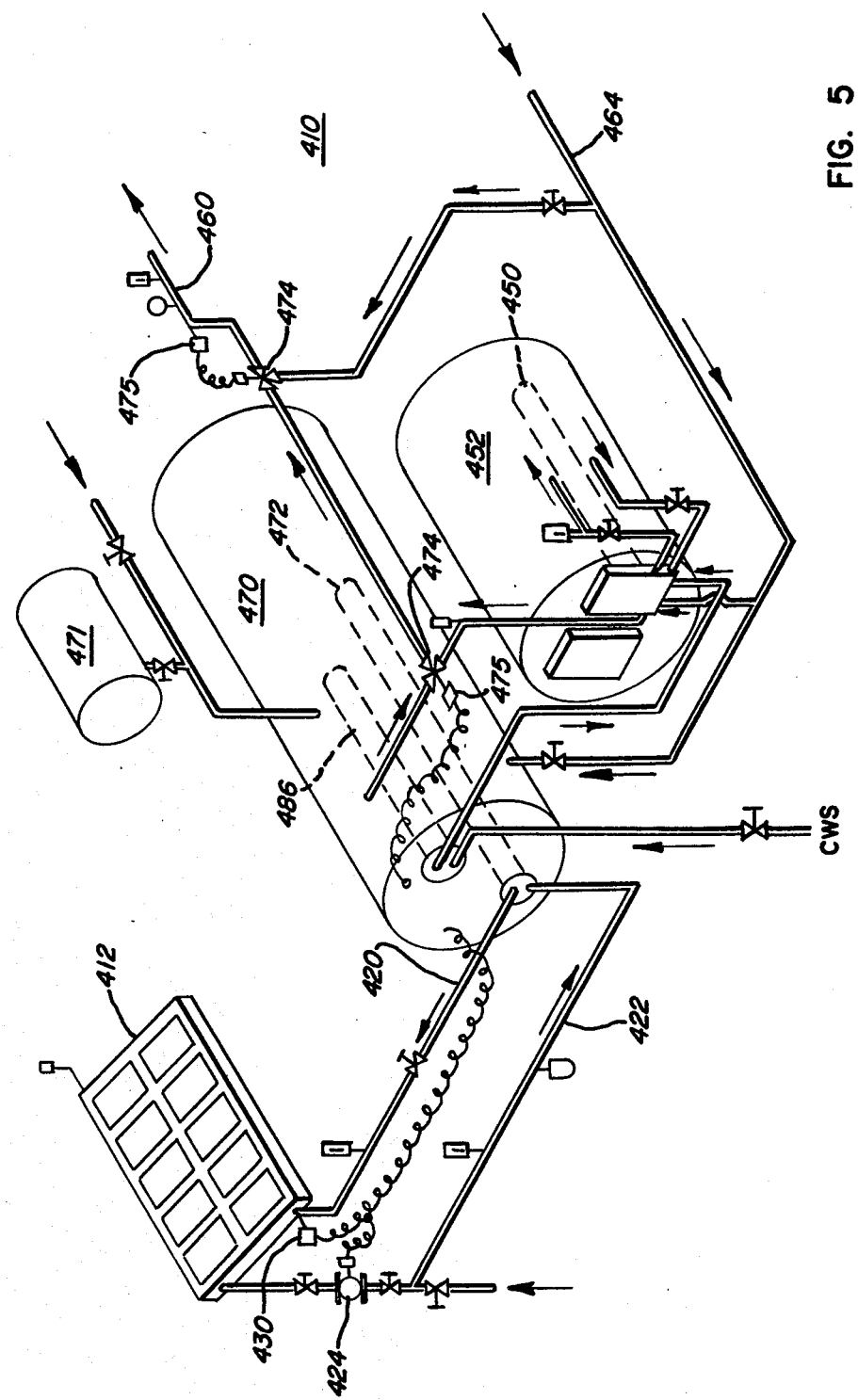
FIG. 5 is a diagrammatic illustration of an alternative embodiment of the present invention and, more specifically, of a peak deferral system.

A peak deferral system is illustrated in FIG. 5 and generally designated as 410. The peak deferral system 410 is similar to the embodiment illustrated in FIG. 2 in that the system 410 includes a solar collector 412, an auxiliary storage tank 470, an expansion tank 471, and a high temperature, high pressure tank 452.

The solar collector 412 operates in a manner similar to those described in the previous embodiments. A first fluid is circulated through lines 420 and 422 in heat transfer relationship with a heat exchanger 472 immersed in a second fluid stored in the auxiliary tank 470. The first fluid is circulated under the control of the aquastat 430 and the pump 424.

The diverter valves 474 and the aquastats 475 establish and control fluid flow to the heat utilization circuits 460 and 464 in accordance with the temperature level of the second fluid stored in the tank 470. More specifically, when the fluid temperature in tank 470 is above a selected valve, the heat utilization circuit's requirements are supplied entirely from solar heat accumulated in the tank 470. During periods of high demand or low solar input, the aquastats 475 and diverter valves 474 function to divert flow from the high temperature, high pressure tank 452.

During this latter operation, heat is transferred from tank 470 to tank 452 by circulating a third fluid through the heat exchanger 486 in the tank 470 and the heat exchanger 450 in the tank 452.

The system 410 is highly flexible with respect to time availability of energy inputs while requiring a minimum of storage space and associated equipment costs. Use of the system 410 allows storage of solar heat energy for later or deferred use and also provides storage of purchased power so that less demand for purchased energy is made during peak periods.

Many modifications and variations of the present invention are possible in light of the above teachings. It should be understood that, within the scope of the appended claims, the invention may be practiced otherwise than as specifically described above.

What is claimed and desired to be secured by Letters Patent of the United States is:

1. In combination
   means for collecting solar energy and heating a first circulating fluid,
   first means for exchanging heat from said first fluid to a second fluid,
   means for elevating the temperature of said second fluid to a preselected level higher than said first fluid,
   second means for exchanging heat from said second fluid to a third fluid, and
   a storage means for storing said third fluid at a preselected pressure above that of its atmospheric boiling point, and means associated with said storage means for maintaining said third fluid at a preselected temperature above its atmospheric boiling point.

2. The combination of claim 1 further comprising means in heat transfer relationship with one of said fluids for utilization of heat energy.

3. The combination of claim 1, said temperature elevating means comprising means for elevating the pressure of said second fluid, means for condensing said second fluid, and means for reducing the pressure of said second fluid.

4. The combination of claim 1, said first fluid comprising an antifreeze solution, said second fluid comprising a refrigerant and said third fluid comprising water.

5. The combination of claim 1 further including at least one temperature sensing device in temperature sensing relationship with said first fluid, said temperature sensing device coupled in operation controlling relationship to said temperature elevating means, said temperature sensing device terminating the operation of said temperature elevating means upon the temperature of said first fluid dropping below a first preselected valve or increasing above a second preselected level.

6. In a thermal storage system, the combination comprising:
   a first liquid circuit for containing a first liquid at substantially atmospheric pressure;
   said first liquid circuit including means for collecting solar energy and heating said first liquid;
   a second liquid circuit for containing a second liquid;
   first means coupled between said first and second liquid circuits for transferring heat from said first to said second liquids;
   a third liquid circuit for containing a third liquid at a pressure substantially above atmospheric pressure;
   second means coupled between said second and third liquid circuits for transferring heat from said second to said third liquid;
   said second liquid circuit including means for superheating said second liquid in said second heat transferring means;

said third liquid circuit including a storage tank for storing said third liquid at a temperature above its atmoshpere boiling point; and means in selective heat transfer relation with said third liquid in said storage tank for utilizing heat energy.

7. The system of claim 6 further comprising means for heating said third liquid in said storage tank in response to predetermined temperature reduction of said third liquid.

8. The system of claim 6, said superheating means comprising means for elevating the pressure of said second liquid, means for condensing said second liquid, and means for reducing the pressure of said second liquid.

9. In combination
means for accumulating solar energy and heating a first fluid;
first means for transferring heat from said first fluid to a second fluid;
second means for transferring heat from said second fluid to a third fluid;
means for elevating the temperature and the pressure of said second fluid to preselected levels;
a storage tank for storing said third fluid at an elevated pressure level, and means for maintaining said temperature at said elevated level, said elevated level of said temperature being above the atmospheric boiling point of said third fluid;
third means for transferring heat from said third fluid to a fourth fluid, and;
means in heat transfer relation with one of said fluids for utilizing heat.

10. The combination of claim 9 further comprising means in heat transfer relation with said third fluid in said storage tank, and means for operating said means in heat transfer relation with said third fluid in response to a predetermined temperature reduction of said third fluid.

11. The combination of claim 9 said heat utilization means including heating and cooling coils and a cooling tower.

12. A method of obtaining fluid at a temperature above its atmospheric boiling point and at a high pressure for use in elevating the temperature of a system fluid, said method comprising the steps of:
circulating a first fluid at substantially atmospheric pressure through a solar energy accumulating apparatus for raising the temperature of said first fluid;
transferring heat from said first fluid to a second fluid;
compressing said second fluid to an elevated pressure level;
passing said pressurized second fluid through condensor coils thereby transferring the heat from said second fluid to a third fluid;
storing said third fluid in a storage vessel at a temperature above the atmospheric boiling point of said third fluid and at a high pressure level;
maintaining said fluid at said temperature level by electric heating means;
transferring said heat to a system fluid, and
circulating said system fluid through a heat energy utilization device.

13. In a thermal storage system, the combination comprising
a first liquid circuit for containing a first liquid at substantially atmospheric pressure;
said first liquid circuit including means for collecting solar energy and heating said first liquid;
a second liquid circuit for containing a second liquid;
first means coupled between said first and second liquid circuits for transferring heat from said first to said second liquid;
an accumulator tank for accumulating said second liquid;
a third liquid circuit for containing a third liquid at a pressure substantially above atmospheric pressure;
second means coupled between said accumulator tank and said third liquid circuit for transferring heat from said second to third liquid;
said third liquid circuit including means for superheating said third liquid;
a fourth liquid circuit for containing a fourth liquid at a pressure substantially above atmospheric pressure;
third means coupled between said third and fourth liquid circuits for transferring heat from said third to said fourth liquid;
said fourth liquid circuit including a storage tank for storing said fourth liquid at a temperature above its atmospheric boiling point.

14. The combination in claim 13 further comprising heat energy utilization means in selective heat transfer relation with said fourth liquid in said storage tank.

15. The combination in claim 14 further comprising means for transferring heat from said second liquid to said heat utilization means if the temperature of said second liquid is above a preselected level and for diverting said second liquid to said second heat exchange means if said temperature of said second liquid is below said preselected level.

16. In an energy system the combination comprising means for collecting solar energy;
a first fluid system including a first fluid in energy transferring relation with said collecting means;
a second fluid system including a second fluid and a reservoir for accumulating said second fluid;
first means for transferring energy from said first fluid to said second fluid;
a third fluid system including a third fluid, and a storage member for storing said third fluid at a pressure above its atmospheric pressure, and
a fourth fluid system including a fourth fluid in energy transferring relation with said third fluid and means for distributing the energy in said fourth fluid.

17. The combination in claim 16 further comprising means for returning said second fluid to said reservoir if the temperature of said fluid is below a preselected level and for diverting said second fluid to said distributing means if the temperature of said second fluid is above a second preselected level.

18. In a thermal storage system for deferring purchased energy demand during peak periods comprising:
means for collecting solar energy and transferring said energy to a first fluid circulating through said means;
a first energy storage device containing a second fluid in heat transfer relationship with said first fluid;
a second energy storage device containing a third fluid in energy transfer relationship with said second fluid, said third fluid stored in said second storage device at a pressure above its atmospheric pressure;

means for heating said third fluid in response to a preselected condition in said system;
means for circulating a fourth fluid in heat transfer relationship with said third fluid;
means for utilizing the energy stored in said second and third fluids; and
means for diverting one of said second and fourth fluids into energy transfer relationship with said utilization means in response to at least one preselected condition existing in said system.

19. The system set forth in claim 18, said heating means including electric resistence heaters, said heaters being energized upon the energy level of said second fluid dropping below a first preselected level and said third fluid dropping below a second preselected level.

20. The system as set forth in claim 18 said diverting means including at least one aquastat in energy sensing relationship with said second and fourth fluids, and at least one diverter valve controlled by said aquastat and in fluid communication with said second and fourth fluids.

* * * * *